United States Patent
Piercy (10) Patent No.: US 7,623,855 B1
(45) Date of Patent: Nov. 24, 2009

(54) SUSTAINABLE WIRELESS SERVICE TESTING

(75) Inventor: Larry Piercy, Joseph, MO (US)

(73) Assignee: Sprint Communications Company L.P., Overland Park, KS (US)

(*) Notice: Subject to any disclaimer, the term of this patent is extended or adjusted under 35 U.S.C. 154(b) by 385 days.

(21) Appl. No.: 11/295,805

(22) Filed: Dec. 6, 2005

(51) Int. Cl.
 *H04M 3/26* (2006.01)
(52) U.S. Cl. .......... 455/423; 455/67.11; 455/67.14; 455/424; 379/1.01
(58) Field of Classification Search ......... 455/423–424, 455/425, 436, 442, 67.14, 445, 67.11, 439; 379/1.01, 10.01, 10.02, 29.01, 15.01, 27.04, 379/221.14
See application file for complete search history.

(56) References Cited

U.S. PATENT DOCUMENTS

| | | | | |
|---|---|---|---|---|
| 5,481,588 A | * | 1/1996 | Rickli et al. ............ | 379/32.01 |
| 5,913,162 A | * | 6/1999 | Gourdin et al. ............ | 455/424 |
| 6,108,536 A | * | 8/2000 | Yafuso et al. ............ | 455/424 |
| 6,272,337 B1 | * | 8/2001 | Mount et al. ............ | 455/423 |
| 6,597,908 B1 | * | 7/2003 | Yu ............ | 455/424 |
| 6,671,265 B1 | * | 12/2003 | Hwang et al. ............ | 370/331 |
| 6,879,811 B1 | * | 4/2005 | Carter et al. ............ | 455/67.11 |
| 7,327,837 B1 | * | 2/2008 | Harlow et al. ............ | 379/114.14 |
| 2005/0032494 A1 | * | 2/2005 | Swant ............ | 455/226.1 |
| 2006/0089146 A1 | * | 4/2006 | Gazzard ............ | 455/445 |

* cited by examiner

*Primary Examiner*—George Eng
*Assistant Examiner*—Brandon J Miller (57) ABSTRACT

A call control system for controlling testing in a mobile switching center (MSC) comprises an interface and a processing system. The interface is configured to receive a test call from a test device to a tone card internal to the MSC. The processing system is configured to determine a primary route for routing the test call to the tone card for a first duration, generate first routing instructions indicating the primary route, after the first duration determine a secondary route for routing the test call to the tone card during a second duration, and generate second routing instructions indicating the secondary route.

13 Claims, 8 Drawing Sheets

| PHONE NUMBER | KEY |
|---|---|
| XXX-XXX-XXXA | 1 |
| XXX-XXX-XXXB | 2 |
| . | . |
| . | . |
| . | . |
| XXX-XXX-XXXC | 800 |
| XXX-XXX-XXXD | N |

FIG. 6A

| KEY | PRIMARY ROUTE | SECONDARY ROUTE |
|---|---|---|
| 1 | A | X |
| 2 | B | Y |
| . | . | . |
| . | . | . |
| 800 | TONE CARD | KEY 801 |
| 801 | TONE CARD | KEY 800 |

SUSTAINABLE WIRELESS SERVICE TESTING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to wireless telecommunication technologies, and in particular, to wireless telecommunication service testing.

2. Description of the Prior Art

In wireless telecommunication networks, mobile switching centers (MSCs) provide call control and switching for calls placed by wireless customers using wireless handsets. The wireless handsets communicate wirelessly with base stations, which in turn are coupled to MSCs over hardwired connections, such as T-1 lines. MSCs are commonly capable of terminating calls to other wireless customers, as well as to destinations on the public switched telephone network (PSTN).

Often times, it is desirable to test the performance of MSCs. One prior art solution for testing MSC performance is to use a wireless test set to dial a local test number. In such a case, the MSC routes the test call to a switch in the local exchange carrier (LEC) network. The switch terminates the call to a specialized port that provides audio feedback to allow an test engineer to determine the quality of the connection to the MSC. One drawback to this solution is that the LECs frequently change local test numbers without providing updates to wireless operators. Another drawback is that the LECs charge local access fees to the wireless operators when test calls are terminated to their networks.

Figure 1:
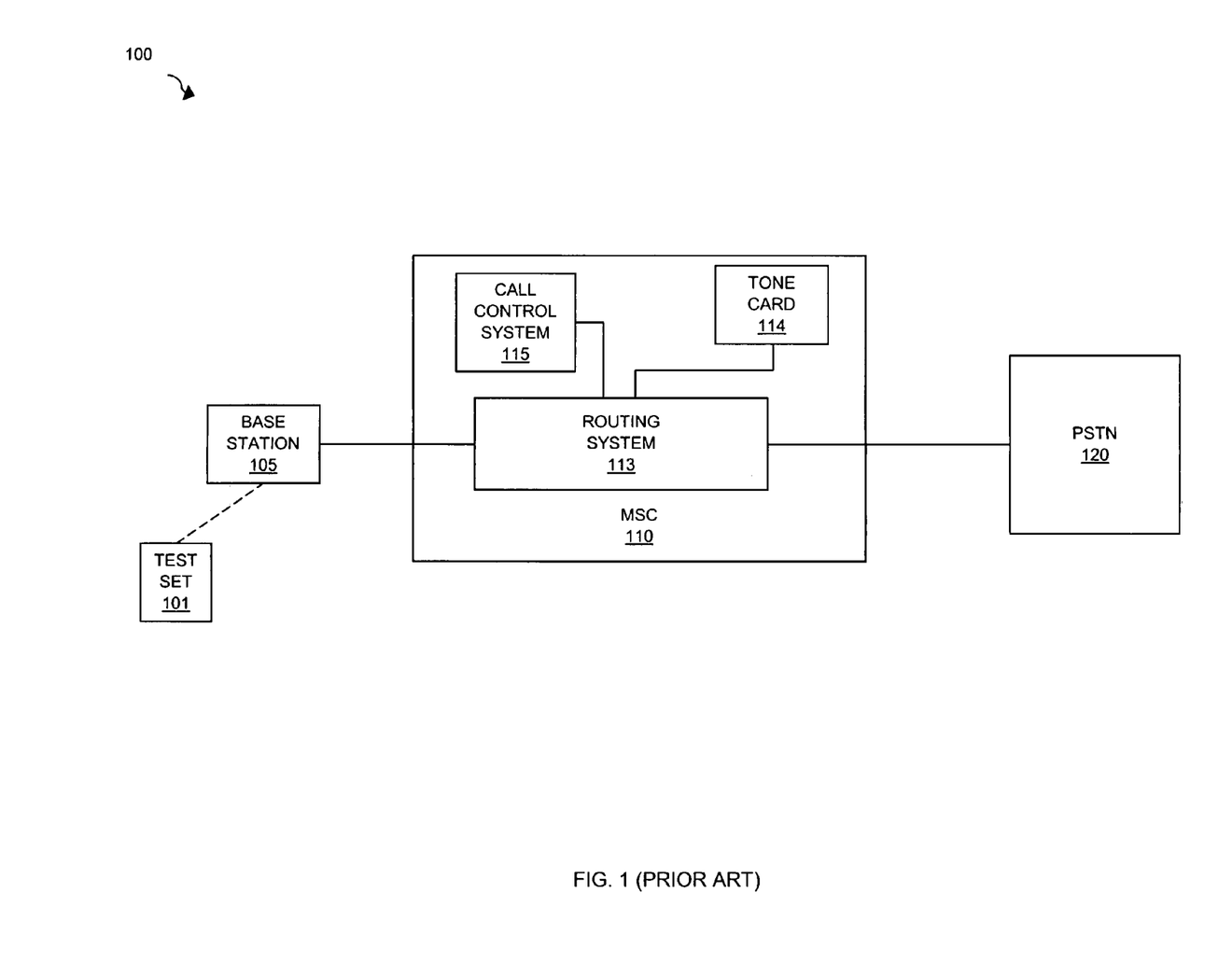
FIG. 1 illustrates a communication network in an example of the prior art.
Figure 2:
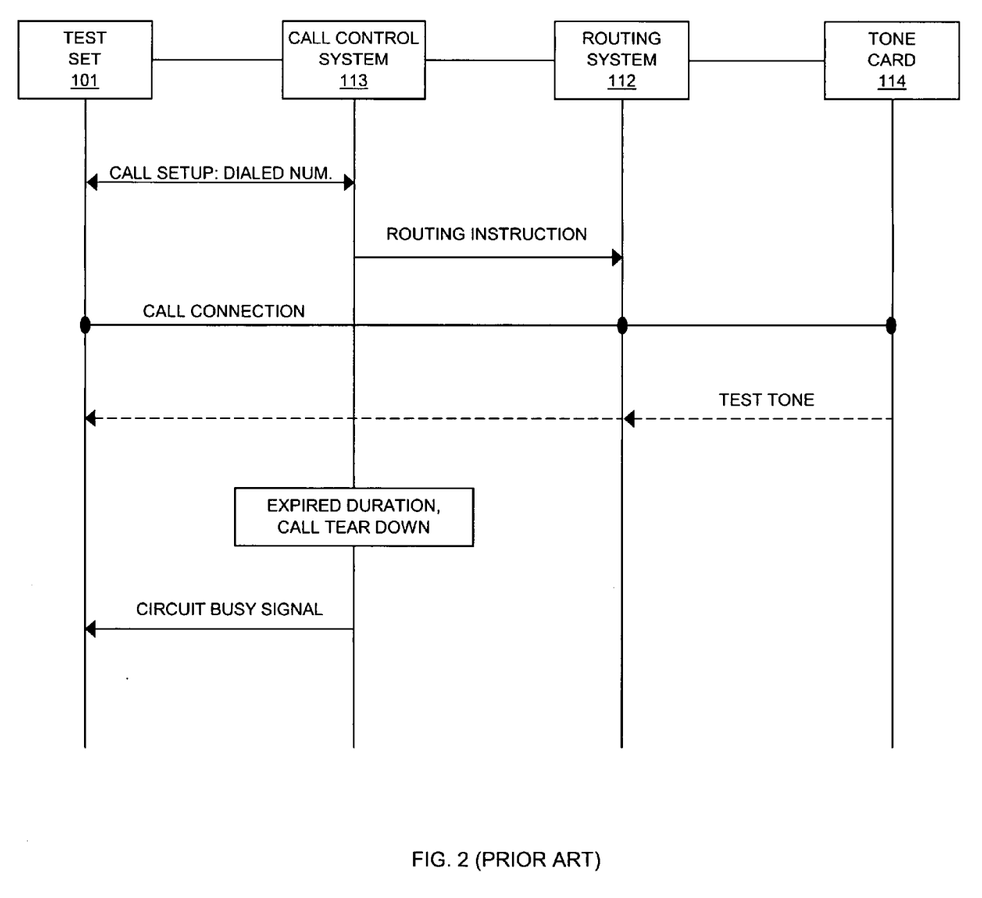
FIG. 2 illustrates the operation of a communication network in an example of the prior art.

One prior art solution to the problems associated with terminating test calls to LEC switches involves installing specialized tone cards in MSCs. FIG. 1 illustrates communication network 100 in an example of the prior art for performing wireless service testing. Communication network 100 includes test set 101, base station 105, MSC 110, and public switched telephone network 120. MSC 110 includes routing system 113, call control system 115, and tone card 114. FIG. 2 illustrates the operation of communication network 110 in a prior art example of service testing.

Referring to FIG. 2, a call is initiated by a test operator placing a call to a specialized telephone number. Call control system 113 processes the phone number using a group of database tables typically referred to as translation tables. The translation tables store routing information in association with phone numbers. Based on the routing information stored in association with the phone number for the tone card, call control system 113 directs routing system 112 to route the incoming call from test set 101 to tone card 114. Call setup is performed between test set 101 and call control system 113 to establish a call connection between test set 101 and tone card 114.

Once the test call is connected, tone card 114 provides tone to test set 101 to enable the test operator to check service quality. In this manner, wireless operators can maintain the test numbers themselves, rather than relying upon a LEC. This solution also eliminates the access charges incurred when terminating to a LEC.

In one problem, current tone cards only allow for testing for a limited amount of time, such as for 255 seconds. As a result, specialized processing elements of call control system 113 are typically programmed to monitor the duration of test calls to tone card 114 and end the calls at the expiration of a specific time period. Upon reaching the time limit, call control system 113 directs that a circuit busy signal be generated and provided to test set 101. Call control system 113 also directs that the call connection to tone card 114 be torn down. The operator must then redial the phone number if it is desired to continue testing.

Unfortunately, prior art tone cards are designed and manufactured by third parties and affecting a change in the design to allow for extended testing would therefore be impractical. In many cases, this time limit significantly hinders the ability of wireless operators to test MSC performance. For example, in such a small amount of time it is not possible for a test operator to move across multiple cells to test how well an MSC handles handoffs between base stations. The specialized processing elements of call control system 114 could be modified to eliminate or bypass the time limits that are set at the beginning of a test call. However, such modifications must be implemented by the MSC manufacturer in response to a request for feature by the wireless operators and are typically prohibitively expensive.

SUMMARY OF THE INVENTION

An embodiment of the invention helps solve the above problems and other problems by providing systems, methods, and software that allows for sustaining a wireless test call to a tone card internal to an MSC for an unlimited period of time. In addition, an embodiment of the invention eliminates the need for an expensive request for feature and the need for a redesigned tone card.

In an embodiment of the invention, a call control system for controlling testing in a mobile switching center (MSC) comprises an interface and a processing system. The interface is configured to receive a test call from a test device to a tone card internal to the MSC. The processing system is configured to determine a primary route for routing the test call to the tone card for a first duration, generate first routing instructions indicating the primary route, after the first duration determine a secondary route for routing the test call to the tone card during a second duration, and generate second routing instructions indicating the secondary route.

In an embodiment of the invention, the interface is configured to transfer the first routing instructions and the second routing instructions to a routing system internal to the MSC.

In an embodiment of the invention, the interface is configured to receive the test call from a first base station in communication with the test device and wherein the processing system is configured to handoff the test call from the first base station to a second base station during the test call.

In an embodiment of the invention, the test call is connected to the interface over a first leg and wherein the test call remains connected to the interface over the first leg during the first duration and the second duration.

In an embodiment of the invention, the tone card is configured to provide tone to the test device during the test call.

In an embodiment of the invention, the processing system is configured to determine the secondary route in response to the end of the first duration.

In an embodiment of the invention, a method of operating a call control system for controlling testing in a mobile switching center (MSC) comprises receiving a test call from a test device to a tone card internal to the MSC, determining a primary route for routing the test call to the tone card during a first duration, generating first routing instructions indicating the primary route, after the first duration, determining a secondary route for routing the test call to the tone card during a second duration, and generating second routing instructions indicating the secondary route.

In an embodiment of the invention, a software product for operating a call control system to control testing in a mobile switching center (MSC) comprises software and a storage medium configured to store the software. The software is operational when executed by a computer system to direct the computer system to receive a test call from a test device to a tone card internal to the MSC, process the test call to determine a primary route for routing the test call to the tone card during a first duration, generate first routing instructions indicating the primary route, after the first duration determine a secondary route for routing the test call to the tone card during a second duration, and generate second routing instructions indicating the secondary route.

BRIEF DESCRIPTION OF THE DRAWINGS

The same reference number represents the same element on all drawings.

DETAILED DESCRIPTION OF THE PREFERRED EMBODIMENT

FIGS. 3-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Configuration and Operation—FIGS. 3-8

Figure 3:
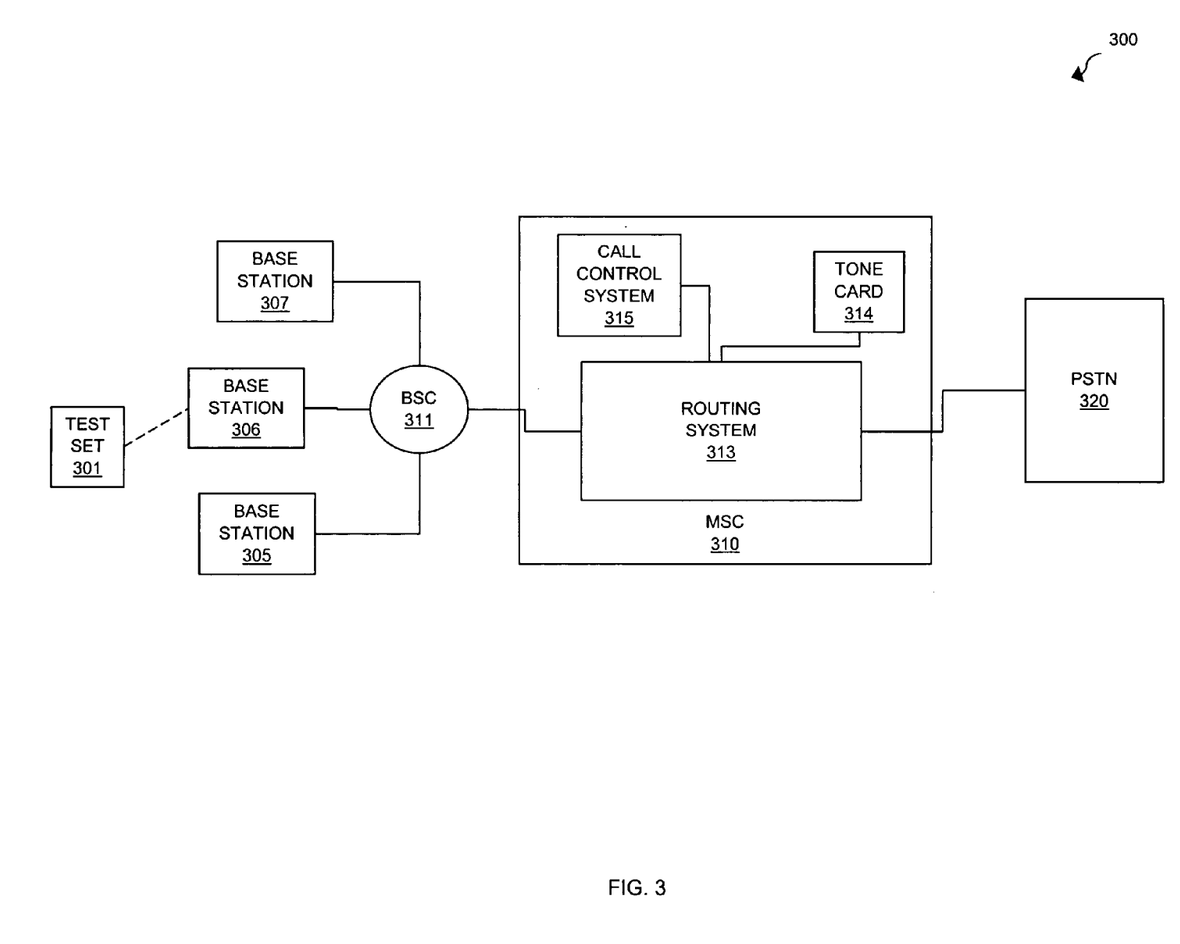
FIG. 3 illustrates a communication network in an embodiment of the invention.

FIG. 3 illustrates communication network 300 in an embodiment of the invention. Communication network 300 includes MSC 310, test set 301, base stations 305, 306, and 307, base station controller (BSC) and 311. MSC 310 includes routing system 313, call control system 315, and tone card 314.

Test set 301 operatively communicates wirelessly with base station 306 in accordance with wireless protocols well known in the art, such as general service mobile (GSM), code division multiple access (CDMA), and wireless fidelity (WiFi). Other wireless protocols are possible. Test set 301 could be, for example, a wireless phone, as well as other types of test sets. Base station 306 is coupled to BSC 311 by a well known backhaul link. BSC controls base station 306 and is further coupled to MSC 310 by a well known backhaul link. Routing system 313 could include interface systems that provide interface capabilities for MSC 310 for interfacing bearer traffic and signaling traffic. Similarly, routing system 313 could include interface systems to provide interface capabilities to control system 315 and tone card 314. Routing system 313 is any routing system capable of routing communications between interface systems 312 and 311. Routing system 313 is additionally any routing system capable of internally routing communications for call control system 315 and tone card 314.

Call control system 315 could be any system capable of controlling calls incoming and outgoing to and from MSC 310. For example, call control system 315 is capable of providing call control over calls placed by wireless customers to destinations on PSTN 320. Call control is well understood in the art. Call control system 315 could be further capable of controlling test calls to tone card 314. Tone card 314 could be any tone card capable of receiving a test call and providing tone in response to the call.

Figure 4:
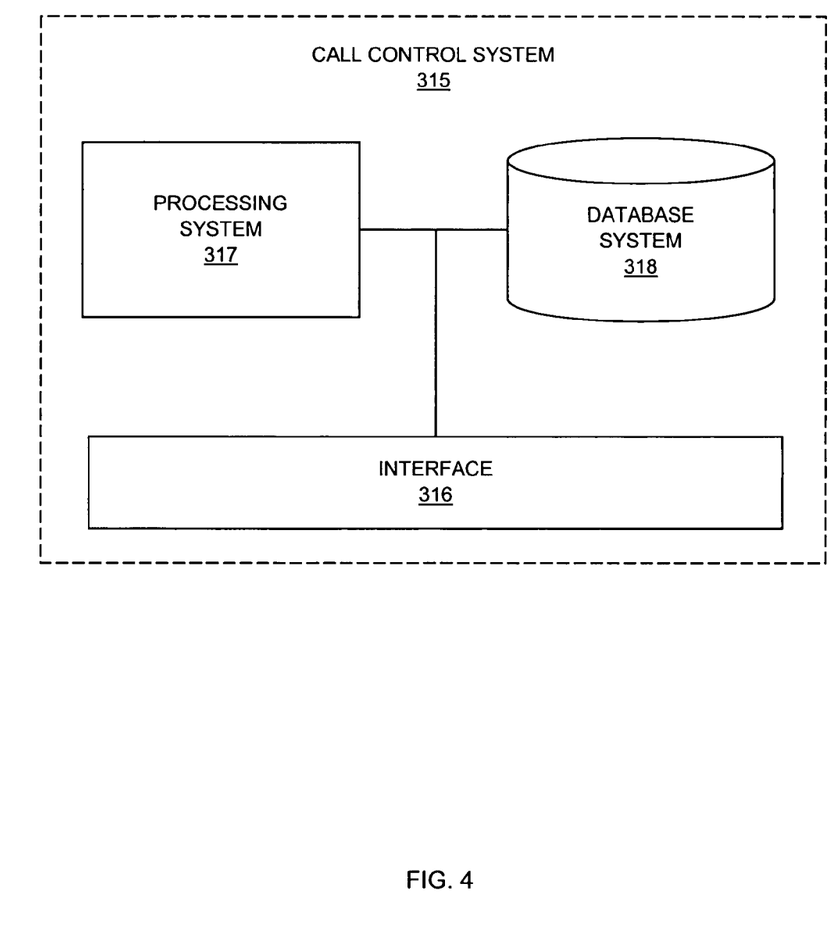
FIG. 4 illustrates a call control system in an embodiment of the invention.

FIG. 4 illustrates call control system 315 in further detail. Call control system 315 includes processing system 317, interface 316, and database system 318. Database system 318 could comprise translation tables and a database engine capable of processing the translation tables. Processing system 317 could be any processing system capable of interfacing with database system 318 to provide call control for MSC 310. Processing system 317 could comprise hardware, software, firmware, or special purpose circuitry, or any combination thereof capable of providing call control. Processing systems and database systems are well known in the art. Interface 316 could be any interface capable of providing interface functions between call control system 315 and other elements of MSC 310.

The following describes an example of a typical wireless phone call handled by MSC 310. An end user using a wireless device places a phone call to a destination on PSTN 320. The user dials a series of digits. The dialed digits are transmitted over the wireless backhaul to MSC 310. Routing system 313 receives the dialed digits and passes the digits to call control system 315. Call control system 315 applies well known call control processes, such as call validation, to the dialed digits. The dialed digits are eventually passed to database system 318 to determine a route for the call. The database engine of database system 318 access the translation tables of database system 318 to look-up the primary route for the call based on the dialed digits. Routing instructions are passed back to call control system 315.

Call control system 315 provides the routing instructions to routing system 313. The routing instructions could be provided in the form of control messages, signals, or the like. The call could be incoming to a particular port on routing system 313. In accordance with the routing instruction, routing system 313 could route the incoming call to an appropriate outgoing port on interface system 311. The outgoing port links the incoming leg of the call to an appropriate destination on PSTN 320, such as a telecommunication switch. Call signaling for the call can also be passed by interface system 311. External signaling channels are also possible.

In some cases, the primary route to a destination is unavailable. In such a case, control system 315 accesses the same translation tables to determine a secondary route to the destination. Assuming the secondary route is available, the call can be connected over the secondary route.

Figure 5:
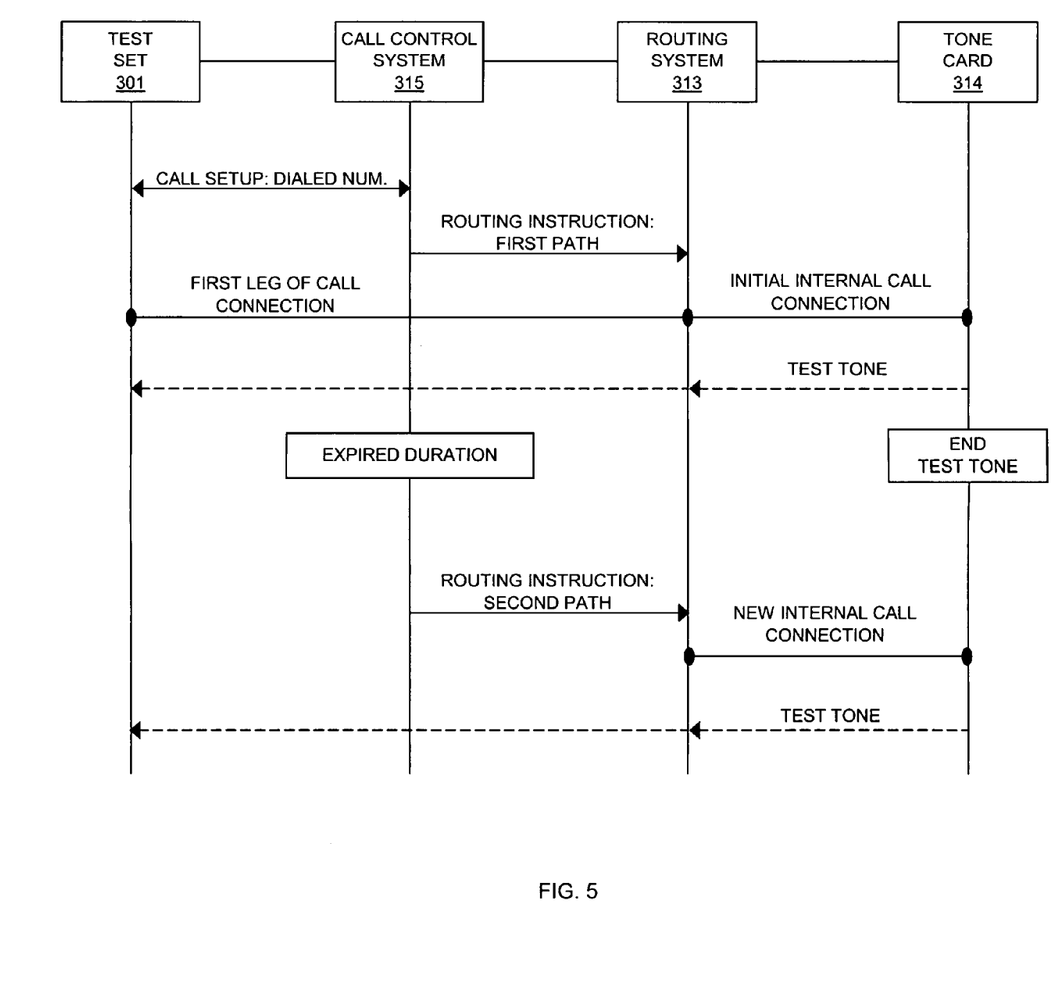
FIG. 5 illustrates a call flow diagram in an embodiment of the invention.

FIG. 5 illustrates a call flow diagram in an embodiment of the invention. In this embodiment, test set 301 and call control system 315 engage in call setup, including transmittal of dialed digits to call control system 315. Call control system 315 determines routing instructions for the call and transfers the routing instructions to routing system 313. Routing system 313 connects the test call to tone card 314. Importantly, the incoming leg of the call from test set 301 traverses base station 306 and BSC 311. Tone card 314 provides test tone to test set 301 during a first time period.

Internal to call control system 315, a timer monitors the duration of the test call against a time limit. At the end of the time limit, call control system 315 releases tone card 314 from the call. Tone card 314 would otherwise cease providing tone at the expiration of a hard coded time limit, such as 255 seconds. Upon releasing tone card 314 from the call, call control system 315 proceeds to determine a secondary route for the call rather than tearing down the incoming call leg from test set 301. Upon determining the secondary route, routing instructions are transferred to routing system 313. Routing system 313 establishes a new connection internally to tone card 314. Tone card 314 perceives that a new call has been established and responsively provides tone to test set 301.

Figure 6A:
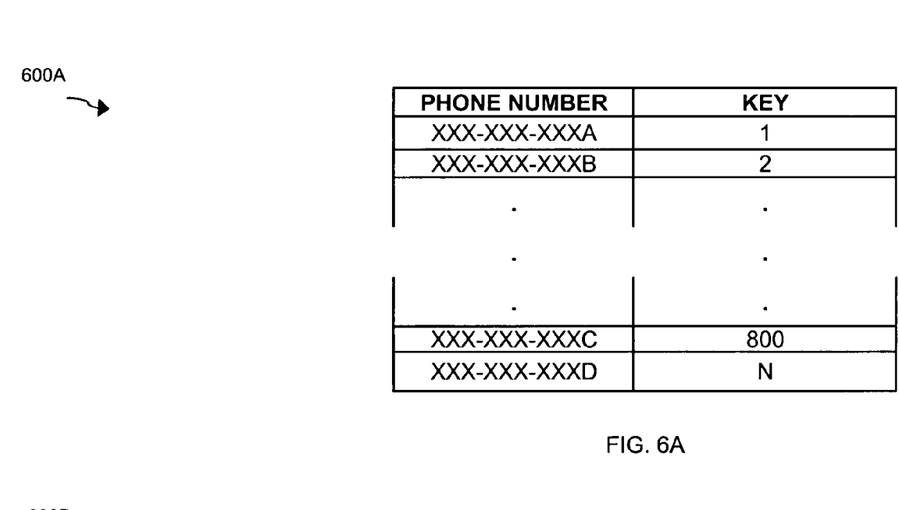
FIG. 6A illustrates a translation table in an embodiment of the invention.

FIG. 6A illustrates translation table 600A in an embodiment of the invention. Translation table 600A could be an example of a translation table stored in database system 318. Translation table 600A depicts two columns, although more columns are possible. From left to right, the first column stores phone numbers in the XXX-XXX-XXXX format. The second column holds keys associated with the phone numbers.

Figure 6B:
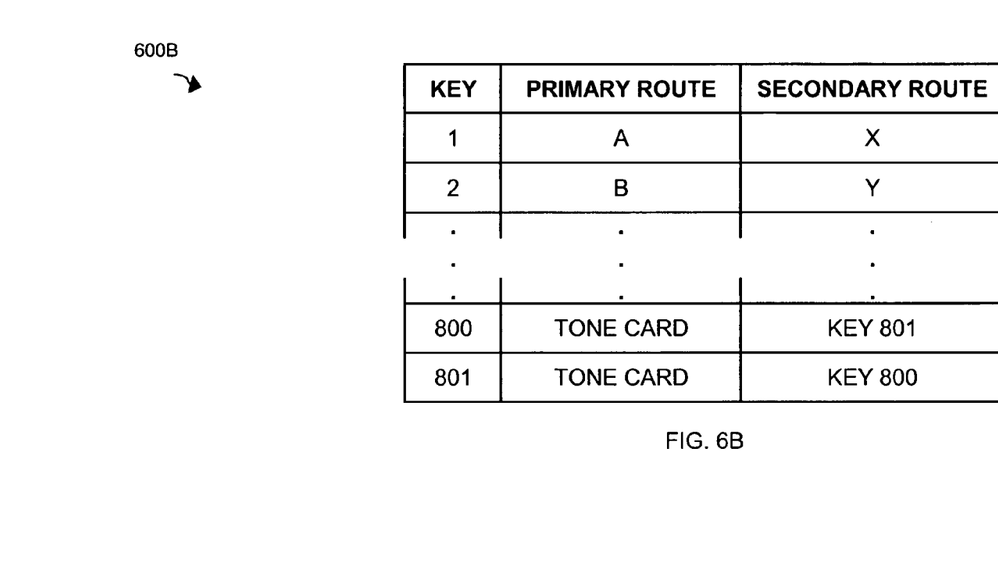
FIG. 6B illustrates a translation table in an embodiment of the invention.

FIG. 6B illustrates translation table 600B in an embodiment of the invention. Translation table 600B could be an example of a translation table stored in database system 318. Translation table 600B depicts three columns, although more columns are possible. From left to right, the first column stores keys. The keys are used as an index to routing commands. The second column stores a primary route. The third column stores a secondary route. As indicated in FIG. 3, key 1 has a primary route A and a secondary route X. Key 2 has a primary route B and a secondary route Y.

As further indicated in FIG. 6B, key 800 indicates a primary route as tone card 314. The secondary route for key 800 is a pointer to key 801. The primary route associated with key 801 is again tone card 314. The secondary route associated with key 801 is a pointer to key 800. In this manner, a loop is created in translation table 600B.

Figure 7:
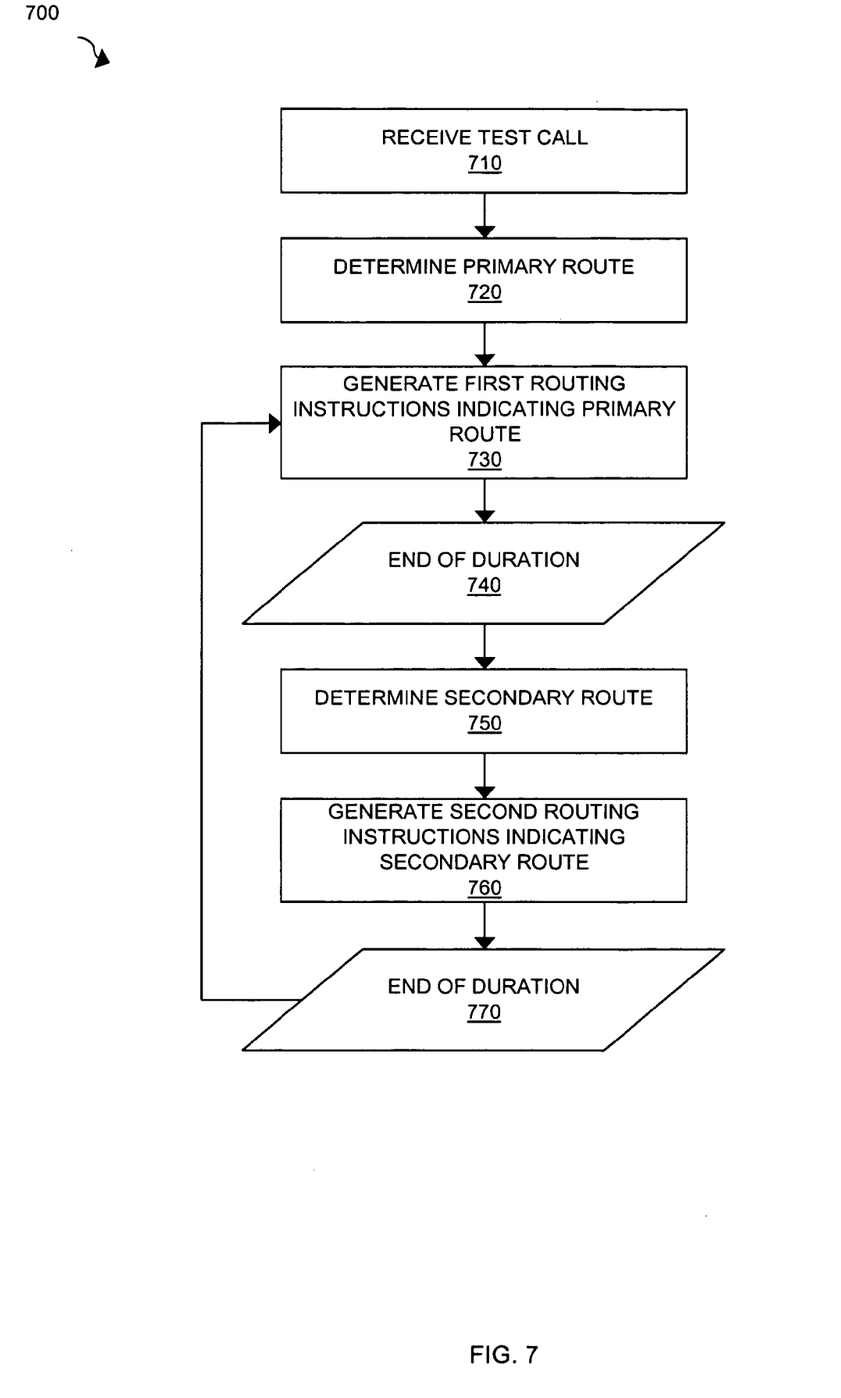
FIG. 7 illustrates a process for the operation of a call control system in an embodiment of the invention.

FIG. 7 illustrates process 700 for the operation of control system 315 in an embodiment of the invention. To begin, MSC 310 receives a test call from test set 301 (Step 710). The test call includes dialed digits. The dialed digits are passed to call control system 315. Call control system 315 determines the primary route for the test call (Step 720). Internal to call control system 315, processing system 317 queries database system 318 with the dialed digits. The database engine of database system 318 accesses translation table 600A to determine the key associated with the dialed digits. In this case, the dialed digits are XXX-XXX-XXXC, and the key is 800.

Next, the database engine accesses translation table 600B to determine the primary route based on the key 800. The primary route indicates that the call should be routed internally to tone card 314. Database system 318 passes the primary route back to processing system 317. Processing system 317 responsively generates routing instructions indicating the primary route and transfers the routing instructions to routing system 313 (Step 730). The call is then connected to tone card 314. Tone card 314 responsively provides audible tone to test set 301 over the connection.

Upon connecting the call to tone card 314, processing system 317 initiates a timer to limit the duration of the call. Upon expiration of the duration (Step 740), processing system 318 proceeds to determine the secondary route for the call (Step 750). Processing system queries database system 318 with the dialed digits and an indicator that the primary route is unavailable. The database engine of database system 318 accesses translation table 600B using the key to determine the secondary route associated with the key. In this case, the secondary route associated with key 800 points to key 801. The database engine jumps to key 801 and reads the primary route. In this case, the primary route for key 801 is tone card 314. The database engine passes an identifier for tone card 314 back to processing system 317. Processing system 317 responsively generates routing instructions for the call to be routed internally to tone card 314 (Step 760). The routing instructions are transferred to routing system 313. The routing instructions direct routing system 313 to route the call to tone card 314.

Processing system 317 can again initiate a timer to limit the duration of the call. Upon expiration of the duration (Step 770), processing system 317 transfers a query to database system 318 indicating the dialed digits and that the primary route is unavailable. In response, the database engine accesses translation table 600B to determine the secondary route associated with key 801. In this case, the secondary route associated with key 801 points to key 800. The database engine responsively reads the primary route associated with key 800, which in this case is tone card 314. A response is transferred back to processing system 317 indicating that the call should be connected to tone card 314.

Advantageously, process 700 could be repeated indefinitely to allow an operator using test set 101 to conduct test operations beyond the timed duration allowed for calls to tone card 314. The loop created by translation table 600B allows the incoming leg of the test call from test set 301 to remain up. In addition, the loop created in translation table 600B allows the internal route to tone card 314 can be re-established at the end of each predetermined or preprogrammed duration. In this manner, the need for a request for feature is eliminated and the configuration of processing system 317 remains unchanged. In addition, the configuration of tone card 314 remains unchanged.

Figure 8:
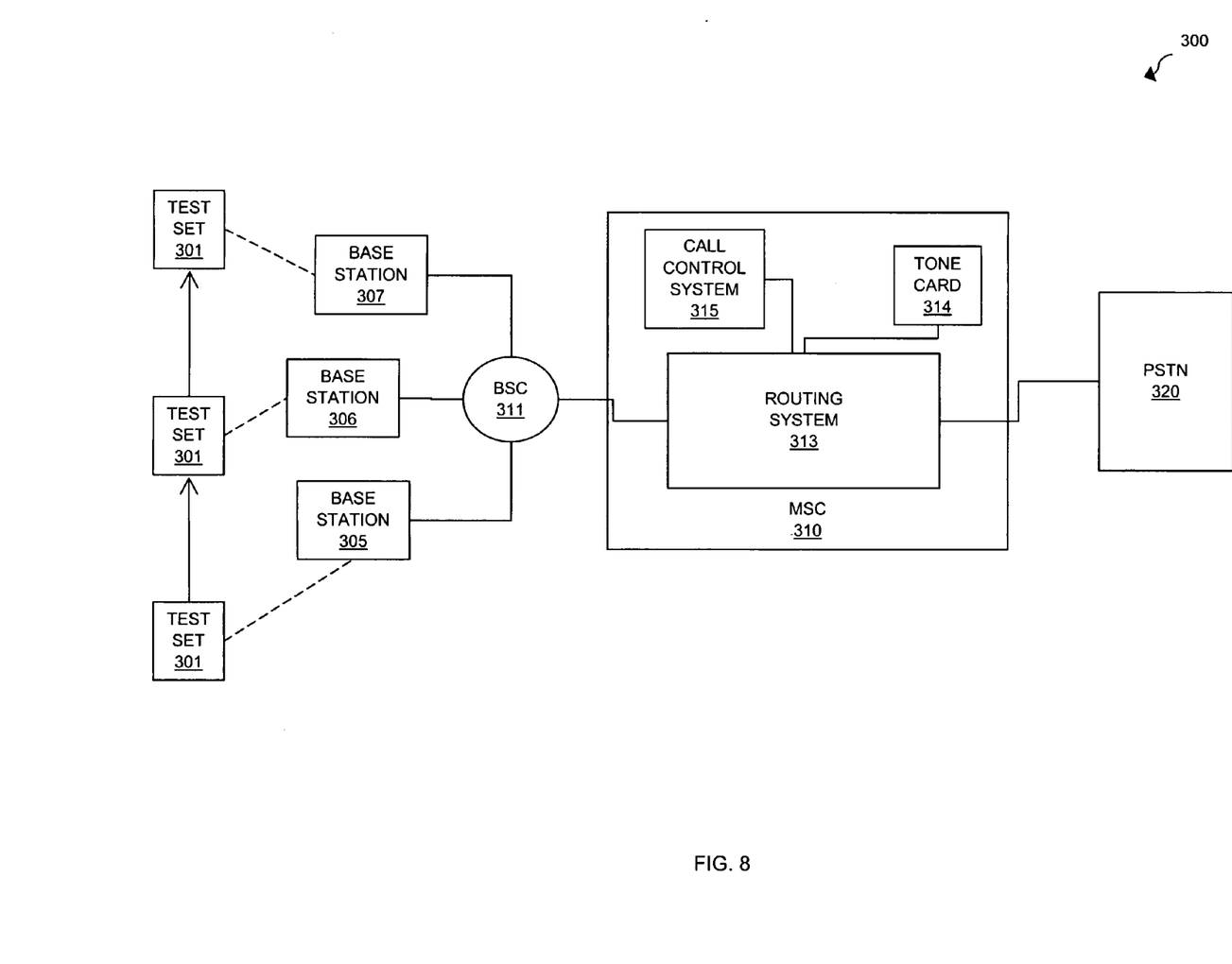
FIG. 8 illustrates a communication network in an embodiment of the invention.

FIG. 8 illustrates a roaming example with respect to communication network 300. In this example, an operator using test set 301 is able to roam between base stations 305, 306, and 307 due to the ability of call control system 315 to continuously re-establish connections internally to test card 314. In this manner, sustained wireless service testing is possible.

What is claimed is:

1. A call control system for controlling testing in a mobile switching center (MSC) and maintaining at least a single test call to the MSC for a duration of time, the call control system comprising:

an interface configured to receive the single test call from a test device to a tone card internal to the MSC; and a processing system configured to determine a primary route for routing the single test call to the tone card during a first portion of the duration of time, and generate first routing instructions indicating the primary route;

the processing system further configured to, after the first portion, determine a secondary route for routing the single test call to the tone card during a second portion of the duration of time, and generate second routing instructions indicating the secondary route.

2. The call control system of claim 1 wherein the interface is configured to transfer the first routing instructions and the second routing instructions to a routing system internal to the MSC.

3. The call control system of claim 1 wherein the interface is configured to receive the single test call from a first base station in communication with the test device and wherein the processing system is configured to handoff the single test call from the first base station to a second base station during the single test call.

4. The call control system of claim 1 wherein the single test call is connected to the interface over an incoming first leg and wherein the single test call remains connected to the interface over the incoming first leg during the first portion and the second portion.

5. The call control system of claim 1 wherein the tone card is configured to provide tone to the test device during the single test call.

6. The call control system of claim 1 wherein the processing system is configured to determine the secondary route in response to the end of the first portion.

7. A method of operating a call control system for controlling testing in a mobile switching center (MSC) and maintaining at least a single test call to the MSC for a duration of time, the method comprising:

receiving the single test call from a test device to a tone card internal to the MSC;

determining a primary route for routing the single test call to the tone card during a first portion of the duration of time;

generating first routing instructions indicating the primary route;

after the first portion, determining a secondary route for routing the single test call to the tone card during a second portion of the duration of time; and generating second routing instructions indicating the secondary route.

8. The method of claim 7 further comprising transferring the first routing instructions and the second routing instructions to a routing system internal to the MSC.

9. The method of claim 7 comprising receiving the single test call from a first base station in communication with the test device and handing off the single test call from the first base station to a second base station during the single test call.

10. The method of claim 7 wherein the single test call is connected over an incoming first leg and wherein the single test call remains connected over the incoming first leg during the first portion and the second portion.

11. The method of claim 7 further comprising the tone card providing tone to the test device during the single test call.

12. The method of claim 7 comprising determining the secondary route in response to the end of the first portion.

13. A storage medium readable by a processing system, having instructions stored thereon to maintain a single test call to a mobile switching center (MSC) for a duration of time, wherein the instructions, when executed by the processing system, direct a call control system in the MSC to:

receive the single test call from a test device to a tone card internal to the MSC, process the single test call to determine a primary route for routing the single test call to the tone card during a first portion of the duration of time, generate first routing instructions indicating the primary route, after the first portion determine a secondary route for routing the single test call to the tone card during a second portion of the duration of time, and generate second routing instructions indicating the secondary route.

* * * * *

UNITED STATES PATENT AND TRADEMARK OFFICE
CERTIFICATE OF CORRECTION

PATENT NO.      : 7,623,855 B1
APPLICATION NO. : 11/295805
DATED           : November 24, 2009
INVENTOR(S)     : Larry Piercy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this

Twenty-sixth Day of October, 2010

David J. Kappos
*Director of the United States Patent and Trademark Office*